United States Patent
Bussit et al.

(10) Patent No.: US 7,467,702 B2
(45) Date of Patent: Dec. 23, 2008

(54) CLUTCH RELEASE BEARING AND METHOD OF MANUFACTURE

(75) Inventors: Sylvain Bussit, Tours (FR); Claude Caillault, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 209 days.

(21) Appl. No.: 11/175,013

(22) Filed: Jul. 5, 2005

(65) Prior Publication Data
US 2006/0011445 A1 Jan. 19, 2006

(30) Foreign Application Priority Data
Jul. 2, 2004 (FR) .................... 04 07390

(51) Int. Cl.
*F16D 25/08* (2006.01)
*F16D 23/14* (2006.01)

(52) U.S. Cl. .................. 192/91 A; 192/85 CA; 192/98

(58) Field of Classification Search ............. 92/108, 92/165 PR; 277/575, 372, 373
See application file for complete search history.

(56) References Cited

U.S. PATENT DOCUMENTS

| | | | |
|---|---|---|---|
| 4,029,186 A | 6/1977 | De Gennes | |
| 4,046,238 A | 9/1977 | Mendoza-Orozco | |
| 4,319,220 A | 3/1982 | Pappas et al. | |
| 4,478,595 A | 10/1984 | Hayakawa et al. | |
| 4,528,895 A * | 7/1985 | Nakamura | 92/129 |
| 4,601,374 A | 7/1986 | Ladin | |
| 4,608,741 A | 9/1986 | Mallet | |
| 4,641,523 A | 2/1987 | Andreasson | |
| 4,699,530 A | 10/1987 | Satoh et al. | |
| 4,815,867 A | 3/1989 | Ladin | |
| 4,854,436 A | 8/1989 | Lassiaz et al. | |
| 4,872,768 A | 10/1989 | Brandenstein et al. | |
| 4,874,073 A | 10/1989 | Tagawa | |
| 4,881,629 A | 11/1989 | Gay et al. | |
| 4,946,295 A | 8/1990 | Hajzler | |
| 4,957,133 A | 9/1990 | Linz et al. | |
| 4,970,945 A * | 11/1990 | Schmidt | 92/107 |
| 5,008,647 A | 4/1991 | Brunt et al. | |
| 5,018,384 A | 5/1991 | Hayashi et al. | |

(Continued)

FOREIGN PATENT DOCUMENTS

DE 10148388 4/2003

(Continued)

OTHER PUBLICATIONS

Co-pending U.S. Appl. No. 10/548,866 entitled "Sensor Unit, and Housing Relay for the Production of Said Unit" to Landrieve, filed Sep. 9, 2005, available in Private Pair.

(Continued)

*Primary Examiner*—Rodney H Bonck
(74) *Attorney, Agent, or Firm*—Meyertons, Hood, Kivlin, Kowert & Goetzel, P.C.; Eric B. Meyertons

(57) ABSTRACT

Hydraulically operated clutch release bearing device of the type including an operating element provided with an annular piston and a seal in contact with the piston, and a rolling-contact bearing axially secured to the operating element, the piston including a rear surface in contact with the said seal, at least one concave region being formed locally in the said rear surface of the piston.

10 Claims, 3 Drawing Sheets

U.S. PATENT DOCUMENTS

| | | | |
|---|---|---|---|
| 5,033,013 | A | 7/1991 | Kato et al. |
| 5,264,790 | A | 11/1993 | Moretti et al. |
| 5,372,435 | A | 12/1994 | Genero et al. |
| 5,377,580 | A * | 1/1995 | Merklein et al. ............... 92/248 |
| 5,575,568 | A | 11/1996 | Rigaux et al. |
| 5,592,401 | A | 1/1997 | Kramer |
| 5,598,913 | A | 2/1997 | Monahan et al. |
| 5,713,577 | A | 2/1998 | Lannert et al. |
| 5,721,539 | A | 2/1998 | Goetzl |
| 5,780,731 | A | 7/1998 | Matsui et al. |
| 5,845,230 | A | 12/1998 | Lamberson |
| 5,865,288 | A | 2/1999 | Thomire et al. |
| 5,877,431 | A | 3/1999 | Hirano |
| 6,011,491 | A | 1/2000 | Goetzl |
| 6,013,007 | A | 1/2000 | Root et al. |
| 6,035,990 | A | 3/2000 | Peschke |
| 6,043,643 | A | 3/2000 | Message et al. |
| 6,056,446 | A | 5/2000 | Welter et al. |
| 6,109,624 | A | 8/2000 | Message et al. |
| 6,160,480 | A | 12/2000 | Su-yueh |
| 6,196,552 | B1 | 3/2001 | Peterson et al. |
| 6,267,512 | B1 | 7/2001 | Beghini et al. |
| 6,323,640 | B1 | 11/2001 | Forestiero et al. |
| 6,328,148 | B2 * | 12/2001 | Winkelmann et al. ... 192/85 CA |
| 6,338,576 | B1 | 1/2002 | Girardin et al. |
| 6,415,900 | B1 | 7/2002 | Lopez et al. |
| 6,539,336 | B1 | 3/2003 | Vock et al. |
| 6,611,138 | B2 | 8/2003 | Vasiloiu |
| 6,612,749 | B2 | 9/2003 | Arnault et al. |
| 6,666,784 | B1 | 12/2003 | Iwamoto et al. |
| 6,712,366 | B1 * | 3/2004 | Cargill ....................... 277/372 |
| 6,746,352 | B1 | 6/2004 | Poiret et al. |
| 6,908,229 | B2 | 6/2005 | Landrieve et al. |
| 2003/0002764 | A1 | 1/2003 | Pflugner et al. |
| 2003/0007631 | A1 | 1/2003 | Bolognesi et al. |
| 2004/0013334 | A1 | 1/2004 | Landrieve et al. |
| 2004/0141669 | A1 | 7/2004 | Landrieve et al. |
| 2004/0154895 | A1 | 8/2004 | Thomire et al. |
| 2004/0202392 | A1 | 10/2004 | Niarfeix et al. |
| 2005/0008276 | A1 | 1/2005 | Beghini et al. |
| 2005/0011717 | A1 | 1/2005 | Arnault |
| 2005/0011718 | A1 | 1/2005 | Arnault |
| 2005/0089255 | A1 | 4/2005 | Debrailly et al. |
| 2005/0124447 | A1 | 6/2005 | Message et al. |
| 2005/0165397 | A1 | 7/2005 | Faus et al. |
| 2005/0235513 | A1 | 10/2005 | Niarfeix |
| 2005/0265646 | A1 | 12/2005 | Arnault |
| 2006/0104558 | A1 | 5/2006 | Gallion et al. |

FOREIGN PATENT DOCUMENTS

| | | |
|---|---|---|
| EP | 399855 | 11/1990 |
| EP | 806581 | 11/1997 |
| EP | 1146244 | 10/2001 |
| FR | 2577291 | 8/1986 |
| FR | 2611244 | 8/1988 |
| FR | 2688560 | 6/1991 |
| FR | 2744506 | 8/1997 |
| FR | 2772444 | 6/1999 |
| FR | 2819864 | 7/2002 |
| GB | 1580301 | 12/1980 |
| GB | 2054084 | 2/1981 |
| JP | 6213251 | 8/1994 |

OTHER PUBLICATIONS

Co-pending U.S. Appl. No. 10/552,375 entitled "Freewheel Bearing Device and Freewheel Pulley" to Girardin filed Jan. 18, 2005, available in private Pair.

Preliminary Search Report for FR 0307356 mailed on Nov. 23, 2003 (1 page1).

Preliminary Search Report for FR 0307355 mailed on Nov. 24, 2003 (1 page).

Preliminary Search Report for FR 0407390 (1 page).

Office Action mailed Dec. 30, 2005 for U.S. Appl. No. 10/870,483, available in Pair.

Office Action mailed Jun. 13, 2006 for U.S. Appl. No. 10/870,484, available in Pair.

Preliminary Search Report for FR 0311989 mailed on Feb. 24, 2004 (1 page).

\* cited by examiner

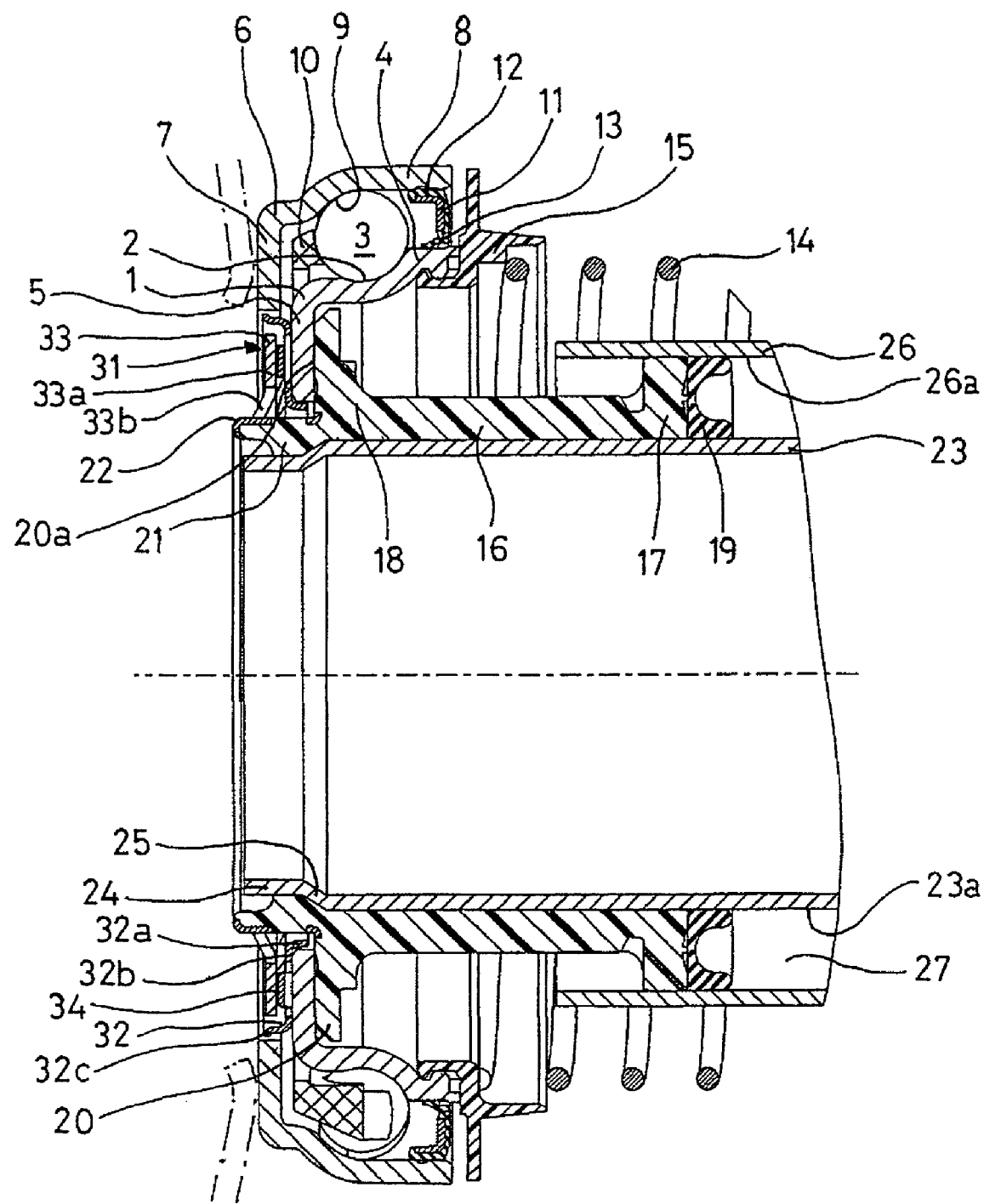
FIG_1

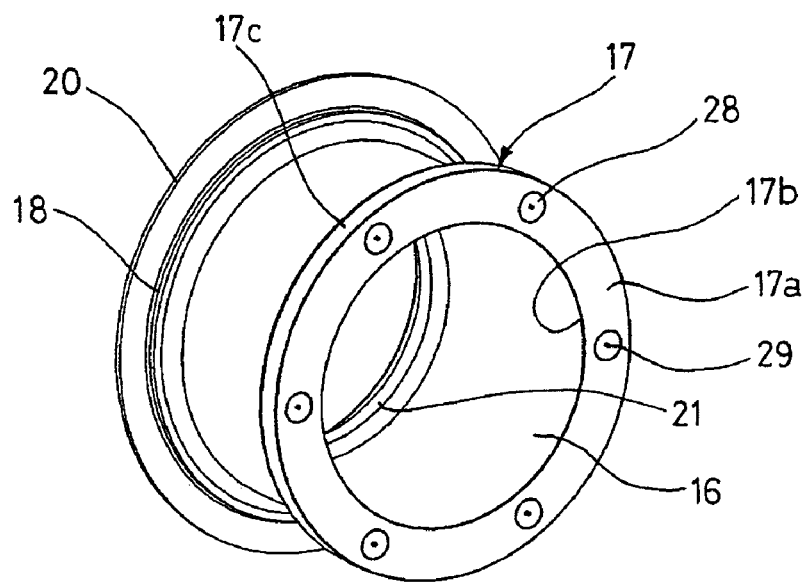
FIG_2
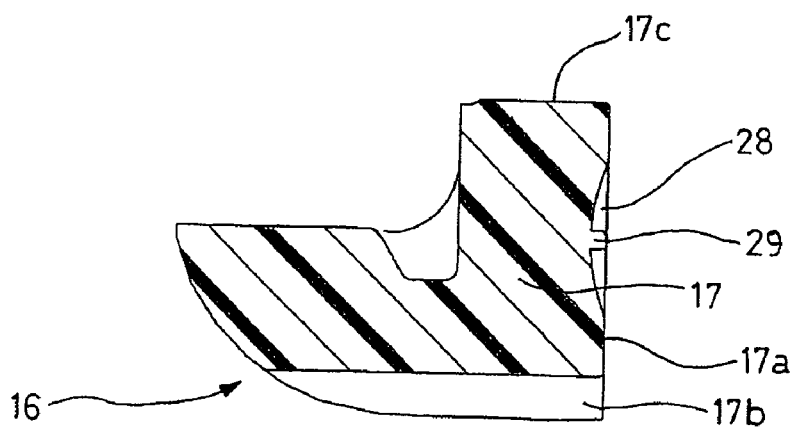
FIG_4
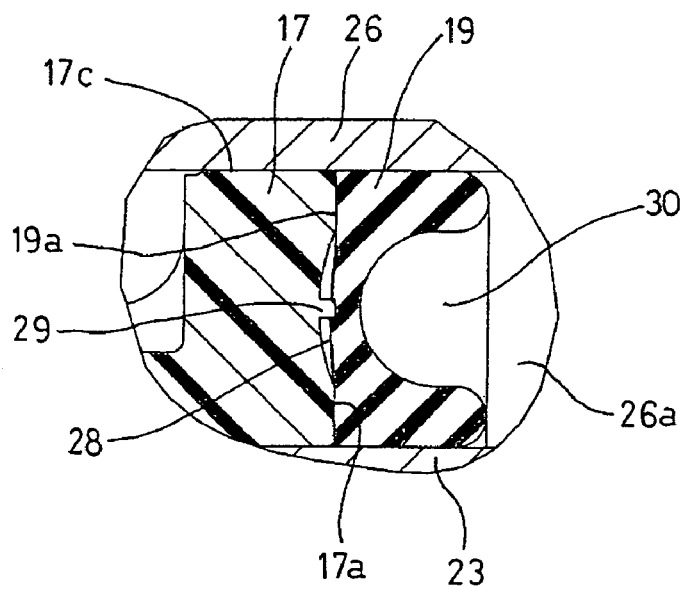
FIG_3

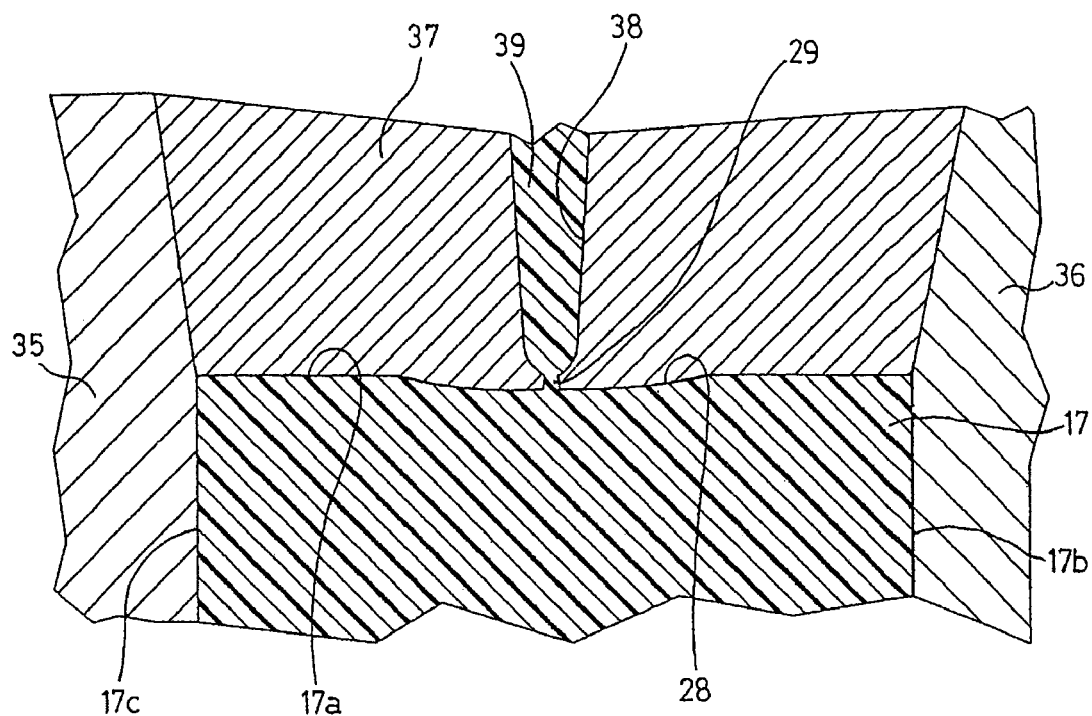
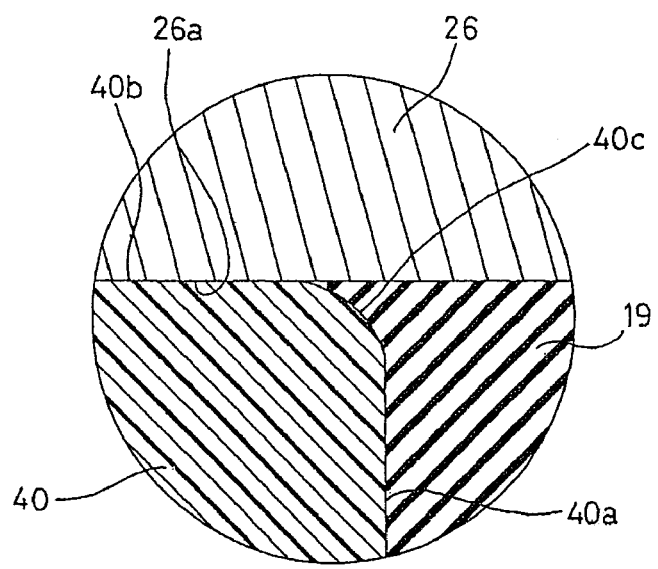
(PRIOR ART)

CLUTCH RELEASE BEARING AND METHOD OF MANUFACTURE

BACKGROUND OF THE INVENTION

1. Field of the Invention

The present invention relates to the field of hydraulically operated clutch release bearings, particularly those intended to act on the diaphragm of a clutch, in particular for a motor vehicle.

2. Description of the Relevant Art

Clutch release bearings generally include a rolling-contact bearing one of the rings of which can rotate and the other ring of which is fixed. Between the rotating ring and non-rotating ring balls are arranged, these being uniformly distributed in the circumferential direction by means of a cage, the rotating ring being equipped with an attack surface intended to come into contact with the end of the fingers that make up the clutch diaphragm. An operating element supports the bearing and moves the thrust bearing axially against the clutch diaphragm.

An operating element includes a piston and means for axially securing the piston to the non-rotating ring. The piston is slideably mounted in an annular chamber of a cylinder fixed to the gearbox casing. The sealing between the piston and the cylinder is afforded by a seal in direct contact with the piston.

In some embodiments, the seal is fixed to the piston by a relatively complicated component—see document FR A 2 772 444. The cost of the component and of mounting it is high.

In other embodiments, the seal is not in any way angularly or axially connected to the piston. In this case, relative angular movements between the seal and the piston may occur both when the piston is being operated and when the piston is at rest in the clutch-engaged state, these movements perhaps being due to vibration and to an internal frictional couple between the rotating part and the non-rotating part of the bearing supported by the piston. Even if these angular movements are of small amplitude, their repetitive nature is likely to give rise to wear that is detrimental to the sealing of the device—see, for example, document FR-A-2 668 560.

SUMMARY OF THE INVENTION

Disclosed herein are embodiments designed to remedy the disadvantages of the aforementioned clutch release bearings.

In one embodiment a clutch release bearing piston is disclosed that is effective, comprises few components, and in which the seal bearing axially against the piston has a lower risk of rotating with respect to the said piston.

The hydraulically operated clutch release bearing device, according to one embodiment, is of the type including an operating element provided with an annular piston and a seal in contact with the piston, and a rolling-contact bearing axially secured to the operating element. The piston includes a rear surface in contact with the seal, at least one concave region being formed locally in the said rear surface of the piston.

The seal is prevented from rotating with respect to the piston by the complete or partial mating of shapes of the concave region or regions in the rear surface of the piston and the corresponding face of the seal. The seal may be formed with a radial front surface, the material of which the seal is made projecting into the concave region or regions in the rear surface of the piston when a pressurized fluid is applied to the hydraulic chamber, the pressurized fluid coming into contact with the seal on the opposite side to the piston. The entity formed by the seal and the piston may be devoid of means of axial attachment and, in particular, devoid of any additional components provided for that purpose.

Advantageously, the piston includes a body and at least one pip projecting into the concave region from the said body, the pip being of one piece with the body. The pip strengthens the angular attachment of the seal and the piston by increasing the mating-shape surfaces of these two components. The pip may be obtained in a particularly economical fashion at the time of the molding of the piston, particularly in the form of sprue.

In one embodiment, a pip is arranged in each concave region. The pip may project axially. The pip may lie flush with the rear surface of the piston. It is advantageous for the pip not to protrude beyond the more or less radial rear surface of the piston. The risk of the pip being broken off while the piston is being handled and fitted is thereby reduced.

In one embodiment, a plurality of concave regions are formed in the rear surface.

In one embodiment, the piston includes an interior cylindrical surface and an exterior cylindrical surface that is coupled to the rear surface thereby forming a sharp corner. The seal afforded by the seal against the walls of the cylinder with which it collaborates is therefore particularly effective.

In one embodiment, the piston is made of a molded synthetic material. The rear surface of the piston has a radial overall shape.

One embodiment relates to a clutch operating system including a cylinder and a hydraulically operated clutch release bearing device. The cylinder may have an annular shape. The cylinder may be formed of a single metal component, for example made of light alloy, or alternatively may be formed of a guide tube forming a small-diameter wall and of a component fixed to the guide tube and forming the large-diameter wall of the cylinder together with the closed end.

Also disclosed is a method of manufacturing an annular clutch release bearing piston, the piston including a rear surface in which at least one bowl is locally formed, in which method the piston material is injected into a mold on the rear surface side of the piston. A rear surface is to be understood as meaning the surface designed to be located on the hydraulic chamber side of the cylinder.

The term "locally" is to be understood as meaning the fact that the concave region extends over only a limited portion of the rear surface, at least in the circumferential direction.

In an embodiment, a mold for the injection-molding of the piston includes molding material injection ducts opening into the bowl. A mold may include one injection duct per bowl.

In an embodiment, at least one projecting pip is formed of sprue of one piece with the rest of the piston.

In other words, a hydraulic clutch release bearing piston is provided with a rear surface, axially at the opposite end to the thrust bearing, of more or less radial shape, including one or several hollow bowls, in which at least one projecting pip is formed. The bowls and the pips encourage angular anchoring of the seal to the piston, the bowl also allowing the pip to be protected against external mechanical knocks prior to the mounting of the thrust bearing, the pip being set back from or flush with the rear surface of the piston.

This then provides the benefit of an associated piston and sealing assembly that is particularly robust and reliable while at the same time remaining economical. The injection-molding method is put to good use to form the pips which are normally considered to be unwanted sprue at the time of mold release. The piston and associated seal assembly may include just two components suitably angularly coupled to one another. It is also particularly advantageous to anticipate injecting the piston via the rear surface as this makes it possible to form sharp corners between the cylindrical surfaces of the piston and the rear surface of the piston at the mold closure. These sharp corners greatly reduce the risk of deformation and creep of the external and internal periphery of the seal, something which would occur if there were a rounded part of the piston near the cylinder, with the risk of that part of the seal that crept into the rounded portions rapidly becoming crushed and damaged as the piston moved and giving rise to a gradual impairment of the sealing.

BRIEF DESCRIPTION OF THE DRAWINGS

The present invention will be better understood from studying the detailed description of some embodiments taken by way of entirely nonlimiting examples and illustrated by the attached drawings, in which:

FIG. 1 is a view in axial section of a clutch release bearing according to one aspect of the invention;

FIG. 2 is a perspective view of the operating element of the bearing of FIG. 1;

FIG. 3 is a detailed view of FIG. 1;

FIG. 4 is a detailed view of the piston of FIG. 1;

FIG. 5 is a partial view in axial section of a mold for a clutch release bearing piston; and FIG. 6 is a detailed view of a seal and of a piston according to the prior art.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As can be seen in FIG. 1, the clutch release bearing includes a thin-walled rolling bearing non-rotating ring 1 made by pressing a metal sheet or a tube having a circular raceway in the form of a portion of torus 2 for a row of rolling elements, in this instance balls 3, the said raceway having a central axial cross section with a profile in the shape of a concave arc of a circle. The inner ring 1 includes an axial portion 4 and a radial portion 5 directed inwards, said portions 4 and 5 being arranged on each side of the rolling elements 3. The non-rotating ring 1 is an inner ring. As an alternative, the non-rotating ring 1 may be an outer ring.

The rolling-contact bearing is completed by an outer ring 6 having a radial portion 7 projecting towards the inside of the entity and a cylindrical portion 8 on the same side as the radial portion 4. The radial portion 7 is capable of coming into contact with the surface of a diaphragm or equivalent element, depicted in chain line, allowing the actuation of a clutch, particularly of a motor vehicle. The outer ring 6 also has a thin wall which may be produced by pressing a metal sheet or a tube. The outer ring 6 has a circular raceway 9, in the form of a portion of a torus, for the row of rolling elements 3, the said raceway having, in central axial section, a profile in the shape of a concave arc of a circle. The rolling elements 3 are kept at a uniform circumferential spacing by a cage 10 between the raceway 2 of the inner ring 1 and the raceway 9 of the outer ring 6. The ball bearing is completed by a sealing member 11 mounted in a sealed manner in the cylindrical portion 8 of the outer ring 6 and including a framework 12 and a flexible part 13 that rubs against a cylindrical bearing surface of the non-rotating ring 1.

Also provided is a spring 14 for the preloading of the thrust bearing visible in FIG. 2 and an attachment element 15. The spring 14 is of the helical type, with a diameter of the same order of magnitude as the outside diameter of the radial portion 4 of the non-rotating ring 1. The attachment element 15 clips onto the free end of the said radial portion 4 and provides the interface between the spring 14 and the non-rotating ring 1. In the case of a thrust bearing of hydraulic type, the spring 14 keeps the thrust bearing pressed against the diaphragm with a certain axial preload when the clutch is not being operated, that is to say when there is no hydraulic pressure in the device intended to operate the thrust bearing.

The clutch release bearing is supplemented by an operating element 16, visible in FIG. 2, including a hydraulic piston 17 and an operating head 18, associated with a seal 19. More specifically, the operating element 16 has an elongate annular shape and is made of synthetic material. The operating element 16 is provided with a cylindrical bore and with an exterior surface surrounded at a certain distance by the spring 14.

The operating head 18 of the operating element 16 includes a radial flange 20 extending outwards, provided with a radial surface 20a on the opposite side to the piston 17, and an axial end 21 having a diameter that is reduced by comparison with the remainder of the operating element 16 and provided on its cylindrical exterior surface with a metal insert 22 made of sheet metal. The operating element 16 may be overmolded onto the insert 22. The insert 22 thus offers an abrasion-resistant exterior surface. The operating element 16 is arranged around a guide tube 23 in the form of a component exhibiting symmetry of revolution having an end 24 of smaller diameter corresponding to the smaller diameter of the end 21 of the operating head 18 and a frustoconical portion 25 making the connection between the smaller-diameter end 24 and the remainder of the guide tube 23. The piston 17 and the seal 19 are in contact with the exterior surface 23a of the guide tube 23.

The guide tube 23 with the larger-diameter tube 26 forms an annular volume in which the hydraulic piston 17 and the seal 19 are located. More specifically, the piston 17 and the seal 19 are located between the cylindrical exterior surface 23a of the guide tube 23 and the bore 26a of the tube 26. An annular chamber 27 is thus formed between the seal 19, the guide tube 23 and the tube 26, the end of the chamber 27 being closed, for example, by a radial extension directed towards the inside of the tube 26, and provided with ducts, not depicted, for supplying pressurized fluid.

The precise structure of the piston 17 and of the seal 19 is better visible in FIGS. 2 to 4. The piston 17, situated at the opposite end to the operating head 18, includes a rear surface 17a in contact with the seal 19, a bore 17b and a cylindrical exterior surface 17c. The rear surface 17a of the piston 17 has a radial overall shape and is provided with a plurality, in this instance six, of hollow recesses in the form of bowls forming concave regions 28 uniformly circumferentially distributed and having a diameter markedly smaller than the radial dimension of the piston 17 equal to the radial distance between the bore 26a and the cylindrical exterior surface 23a. The concave regions 28 are of relatively shallow depth, for example have a depth of the order of 10 to 30% of their diameter, each being provided with a pip or small protrusion 29 located more or less at their center and extending axially towards the rear surface 17a of the piston until they are flush with the said rear surface 17a.

The seal 19 has an annular overall shape, of rectangular cross section, with rounded rear edges and sharp corners at the front edges. An annular groove 30 is formed from the rear surface of the seal 19 on the opposite side to the piston 17, and allows the seal to press firmly, particularly under pressure, against the bore 26a and the exterior surface 23a. The front surface of the seal 19 is in contact with the rear face 17a of the piston 17. In the free state, the front surface of the seal 19 is more or less radial. However, under the effect of the pressure, the front surface of the seal 19 deforms and tends to bulge axially to hug the shape of the rear surface 17a of the piston 17. In other words, the flexible material of which the seal 19 is made, for example rubber or an elastomeric synthetic material, projects axially in full or in part into the concave regions 28 of the piston 17 and axially interferes with the pips 29. This then causes axial interference between the piston 17 and the seal 19 and this guarantees the mutual angular connection of these two elements one with respect to the other. Under the effect of the hydraulic pressure, the pips 29 dig into the soft material of the seal, thus producing an effective device to prevent rotation between the piston and the seal. This rotation-preventing effect is enhanced by the local deformation of the flexible material of the seal which, under the effect of the pressure, slightly penetrates the concave recesses 28.

In the clutch-engaged state, the chamber 27 is full of hydraulic liquid, but the said liquid is not under pressure and the thrust bearing is preloaded by the spring 14 against a diaphragm with a slight preload so that the rotating ring 6 remains in axial contact with the diaphragm which then drives the said rotating ring 6 through a friction effect. Upon clutch release, pressurized hydraulic liquid is introduced into the chamber 27 and thus causes the piston 17 and the thrust bearing to move in a translational movement towards the diaphragm and operate the diaphragm. When the clutch is reengaged, the pressure of the hydraulic liquid is gradually diminished and the diaphragm, through elasticity, pushes the piston 17 back into the chamber 27 as far as its initial position.

The clutch release bearing also includes a means 31 of axially securing the operating element 16 and the thrust bearing, more specifically the non-rotating ring 1. The axial-securing means 31 is of the type allowing a certain radial movement of the non-rotating ring 1 of the thrust bearing with respect to the operating element 16 so as to allow the bearing to self-center on the diaphragm.

The means 31 of axially securing the operating element 16 and the non-rotating ring 1 of the bearing includes a cup 32 with axial elasticity and a washer 33. The cup 32 includes a small-diameter short axial portion 32a in contact with the small-diameter end of the radial portion 5 of the non-rotating ring 1, a radial portion 32b extending outwards from the small-diameter axial portion 32a and a large-diameter portion 32c extending axially in the opposite direction from the axial portion 32a and radially slightly outwards to form a narrow passage with the small-diameter end of the radial portion 7 of the rotating ring 6. The radial portion 32b is in contact with a face of the radial portion 5, whereas the front surface 20a of the flange 20 of the operating head 18 is in contact with the face opposite belonging to the radial portion 5 of the non-rotating ring 1.

A plurality of tabs 34, with axial elasticity, are formed in the radial portion 32b and extend axially away from the radial portion 5 of the non-rotating ring 1. The tabs 34 are uniformly circumferentially distributed and extend in the circumferential direction, while at the same time being in contact with the washer 33 against which they press. The washer 33 includes a radial portion 33a extending towards the inside via slightly oblique cut-out tags 33b extending axially away from the radial portion 5, while at the same time being braced by their free ends against the insert 22 of the end 21 of the operating head 18. The washer 33 is thus attached to the operating element 16. The collaboration between the cup 32 and the washer 33 allows the radial portion 5 of the non-rotating ring 1 to be pressed and held axially against the flange 20 of the operating head 18.

The piston 17 may be manufactured by injection molding as illustrated in FIG. 5. The mold, which is partially depicted, includes an annular hollow component 35 defining the exterior surface 17c, an interior cylindrical component 35 defining the interior surface 17b, and an end piece 37 fitting in between the components 35 and 36 and defining the rear surface 17a of the piston 17. The end piece 37 is provided with six injection ducts 38, just one of which is visible in FIG. 5. The injection ducts 38 narrow at their terminal end. The end piece 37 of the mold meets the exterior 35 and interior 36 components at right angles.

During the molding operation, the synthetic material that is to form the piston 17 passes along the injection ducts 38 and fills the space formed between the various parts 35 to 37 of the mold. After curing and when the mold is opened, the part 37 disengages axially from the parts 35 and 36, which causes the stalk 39 that remains in the injection channels 38 for injecting the piston 17 to separate off, leaving the pips 29.

Furthermore, the fact of having an end piece 37 separate from the exterior 35 and interior 36 components allows these components to be made to meet at right angles and therefore allows a piston 17 to be formed of which the cylindrical exterior surface 17c connects with the radial rear surface 17a more or less at right angles, just as the cylindrical interior surface 17b connects more or less at right angles with the rear surface 17a of the piston 17.

Such right angles cannot be achieved with a mold in which the walls 35, 36 and 37 are made as one piece, because of the fillets that are inevitable in the machining. This would then result in the situation illustrated in FIG. 6, with a piston 40 in which the rear surface 40a is connected to the adjacent cylindrical surfaces, for example the cylindrical surface 40b, with a large fillet which, in operation, would result in deformation of the seal 19 which would tend to creep and to occupy the empty space that remained between the bore 26a of the tube 26 and the rounded edge 40c of the piston 40 between the rear surface 40a and the cylindrical surface 40b. That could result in an increase in the friction forces on the seal and in gradual deterioration of the edges of the seal as they became trapped between the rounded portion 40c and the bore 26a, with detrimental impacts on the sealing.

Using the method described herein it is possible to produce a piston in which the rear surface connects with the adjacent cylindrical surfaces by means of sharp corners, making it possible to prevent the phenomenon of creep and allowing the seal 19 to retain its original shape in regions that are critical for sealing, thus making it possible to increase its life.

The fact of forming the pips 29 using sprue is particularly advantageous in the sense that use may be made of a mold of simple shape, that is more robust and less expensive. The pips 29 allow the seal simply to rest axially against the piston 17 while at the same time benefiting from angular retention with respect to the said piston 17. Among the other advantages of injection-molding the piston 17 via the rear, mention may be made of better positioning within the mold of the metal insert 22 for the front of the operating element 16, the insert 22 being held naturally in place in the closed end of the mold by the pressure of the molten resin. In this way, by virtue of a suitable method that involves no additional cost, it is possible to obtain a piston of simple structure exhibiting good functional characteristics, particularly in terms of sealing and of durability.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. Hydraulically operated clutch release bearing device of the type comprising an operating element provided with an annular piston and a seal in contact with the piston, and a rolling-contact bearing axially secured to the operating element, the piston comprising a rear surface in contact with the said seal, at least one concave region being formed in the said rear surface of the piston, wherein the at least one concave region occupies a limited portion of the rear surface of the piston, and wherein a cavity is defined by the seal and the concave region in the absence of hydraulic pressure, and wherein the cavity is at least partially filled by the seal when pressurized fluid is applied to the seal, and wherein at least one pip projects into the at least one concave region.

2. Device according to claim 1, wherein the piston comprises a body and the at least one pip projecting into the at least one concave region from the said body, the pip being of one piece with the body.

3. Device according to claim 2, wherein the pip projects axially.

4. Device according to claim 2, wherein the pip lies flush with the rear surface of the piston.

5. Device according to claim 1, wherein a plurality of concave regions are formed in the rear surface.

6. Device according to claim 1, wherein the piston comprises an interior cylindrical surface and an exterior cylindrical surface which connect to the rear surface thereby forming a sharp corner.

7. Device according to claim 1, wherein the piston is made of a molded synthetic material.

8. Clutch operating system comprising a cylinder and a device according to claim 1 mounted in the cylinder.

9. Clutch release bearing device comprising:
an operating element comprising a piston and a seal in contact with the piston, the piston comprising a rear surface in contact with the said seal, at least one concave region being formed in the said rear surface of the piston, wherein the at least one concave region occupies a limited portion of the rear surface of the piston, and wherein a cavity is defined by the seal and the concave region in the absence of hydraulic pressure, and wherein the cavity is at least partially filled by the seal when pressurized fluid is applied to the seal, and wherein at least one pip projects into the at least one concave region; and
a rolling-contact bearing axially secured to the operating element.

10. Clutch operating system comprising a cylinder and a device according to claim 9 mounted in the cylinder.

* * * * *